United States Patent [19]
Skov et al.

[11] 3,899,588
[45] Aug. 12, 1975

[54] ROT AND MILDEW PREVENTION EMPLOYING CERTAIN ALKANOIC ACID SALTS

[75] Inventors: Ebbe R. Skov, Middletown; Roderick B. Judge, Montclair; Geoffrey Hemphill, Manasquan, all of N.J.

[73] Assignee: W. R. Grace & Co., New York, N.Y.

[22] Filed: Oct. 17, 1973

[21] Appl. No.: 407,106

Related U.S. Application Data

[63] Continuation-in-part of Ser. No. 304,462, Nov. 7, 1972, Pat. No. 3,786,086.

[52] U.S. Cl. ................................ 424/317; 426/335
[51] Int. Cl. ............................................. A01n 9/24
[58] Field of Search .................... 424/317; 210/540

[56] References Cited
UNITED STATES PATENTS
3,595,665  7/1971  Huitson et al. ..................... 424/317

OTHER PUBLICATIONS
Chemical Abstracts, Vol. 68, (1968), p. 12,487F.
Chemical Abstracts, Vol. 62 (1965), p. 15,490h–154-91a.

*Primary Examiner*—V. D. Turner
*Attorney, Agent, or Firm*—Elton Fisher

[57] ABSTRACT

An aqueous solution useful for preventing rot and mildew comprising an ammonium, alkali metal, or magnesium salt of an alkanoic acid is prepared by adding liquid anhydrous ammonia, an alkali metal hydroxide, or magnesium hydroxide to an agitated aqueous mixture of water and the alkanoic acid in a cooled reactor.

7 Claims, 1 Drawing Figure

PATENTED AUG 1 2 1975
3,899,588
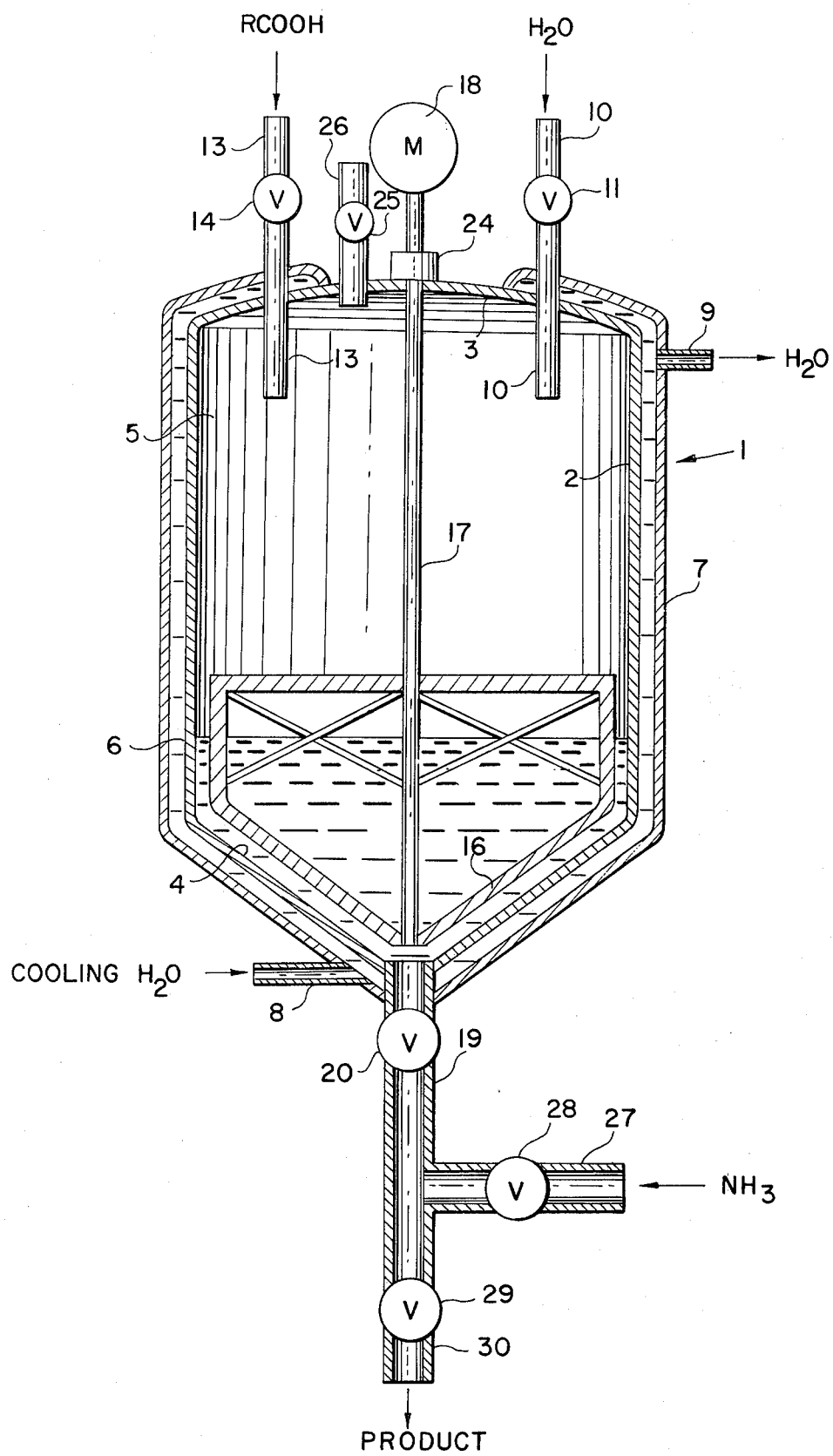

ROT AND MILDEW PREVENTION EMPLOYING CERTAIN ALKANOIC ACID SALTS

CROSS REFERENCE TO RELATED APPLICATION

This is a continuation-in-part of our copending application Ser. No. 304,462 filed Nov. 7, 1972 now U.S. Pat. No. 3,786,086.

BACKGROUND OF THE INVENTION

This invention is in the field of ammonium, alkali metal, and magnesium salts of alkanoic acids having 2–10 carbon atoms. Said invention is directed to a process for preparing aqueous solutions of such salts, said solutions containing a minor amount of alkanoic acid in the free state, and to said solutions per se. The products are aqueous solutions excellently adapted for preserving silage.

British Pat. No. 1,050,639 teaches the preparation of a solid salt of an aliphatic carboxylic acid by adding an aqueous solution of ammonia or an ammonium salt to an aqueous solution containing the aliphatic carboxylic acid, filtering the resulting product and evaporating it to dryness to produce the desired solid ammonium salt.

Polish Pat. No. 51,387 (Chemical Abstracts 68, 12487f) teaches a method for preparing pure neutral solid ammonium acetate by reacting aqueous acetic acid with gaseous ammonia (e.g., 80 kg of glacial acetic in 20 kg of water and 23.3 kg of ammonia). The resulting crystalline ammonium acetate is separated by contrifugation and dried in a stream of dry air at 25°C.

Such prior art processes differ from the process of the instant invention in a number of important points. Among such points are; (a) the prior processes react substantially stoichiometric amounts of ammonia and alkanoic acid while the instant process uses an excess of alkanoic acid leaving about 9–12 percent of the alkanoic acid present in the product as free acid; (b) the prior art processes are directed to the preparation of a solid ammonium salt of an alkanoic acid while the instant process is directed to the preparation of an aqueous solution comprising water, the ammonium salt, and free alkanoic acid; (c) water is a major component of the product of the instant invention while the prior art products, having been "evaporated to dryness" or air dried, are substantially free of water; and (d) the instant invention uses liquid anhydrous ammonia as its ammonia source rather than the ammonia solution, ammonium salt, or gaseous ammonia of the prior art processes.

SUMMARY OF THE INVENTION

In summary, this invention is directed to a composition useful for preventing rot or mildew from developing in silage, said composition being a liquid solution (an aqueous composition) comprising or consisting essentially of an ammonium salt of an alkanoic acid having about 2–10 carbon atoms per molecule, said alkanoic acid in the free state, and water, the mole ratio of said salt to said free alkanoic acid being about 1:0.05–0.2 and the mole ratio of said salt to water being about 1:3.8–5.8.

The ammonium salt can be replaced with an equivalent quantity of an alkali metal or magnesium salt of said acid.

BRIEF DESCRIPTION OF THE DRAWING

The drawing shows, in section with parts cut away, a preferred apparatus for conducting the process of the instant invention.

DESCRIPTION OF PREFERRED EMBODIMENTS

In preferred embodiments of the solution of the above Summary:
1. The alkanoic acid has 4–5 carbon atoms.
2. The alkanoic acid is isobutyric acid or valeric acid.

In another preferred embodiment ("Embodiment A") this invention is directed to a process for preparing the aqueous composition (liquid solution) of the above Summary, said process comprising:

a. forming a first mixture by admixing water and an alkanoic acid having 2–10 carbons, the water and the alkanoic acid being admixed in proportions to provide 1 mole of water per 0.16–0.36 mole of alkanoic acid, in a mixing and reacting zone having a cooling means, an upper portion, a lower portion, and an agitating means positioned in at least the lower portion of said mixing and reacting zone;

b. feeding liquid anhydrous ammonia into the bottom portion of the mixing and reacting zone and agitating the first mixture and the resulting reacting mixture therein while maintaining the temperature of said reacting mixture at about 25°–95°C, the liquid anhydrous ammonia being added in an amount to provide about 0.85–0.95 moles of ammonia per mole of said alkanoic acid; and c. removing the resulting liquid solution from the mixing and reacting zone and recovering said solution.

In especially preferred embodiments of the embodiment of Embodiment A, supra:
1. The alkanoic acid has 4 or 5 carbon atoms.
2. The alkanoic acid is isobutyric acid.
3. The alkanoic acid is valeric acid.

In another preferred embodiment ("Embodiment B") this invention is directed to a process for preparing a liquid solution comprising or consisting essentially of an ammonium salt of an alkanoic acid having about 2–10 carbon atoms per molecule, said alkanoic acid in the free state, and water, said process comprising or consisting essentially of:

a. forming an aqueous mixture by admixing water and the alkanoic acid in a vented mixing and reacting zone, said mixing and reacting zone being closed except for at least one vent and at least one port (which can be closed and which can serve as an inlet port and as an outlet port) said mixing and reacting zone having an upper portion with a top and a lower portion with a bottom, said mixing and reacting zone having an agitating means and a cooling means, the mole ratio of water to alkanoic acid in the liquid aqueous mixture being about 1:0.16–0.36;

b. forming the aqueous solution comprising or consisting essentially of the ammonium salt of said alkanoic acid, said alkanoic acid in the free state, and water by feeding liquid anhydrous ammonia into the aqueous mixture in the mixing and reacting zone through a port positioned in or near the bottom of the lower portion of the mixing and reacting zone while; (i) agitating the aqueous mixture and the resulting reacting mixture; and (ii) maintaining the temperature of the reacting mixture at about 25°–95°C (preferable 65°–85°C) to convert a major portion of the alkanoic acid to its ammonium salt, the liquid anhydrous ammonia being fed into the mixing and reacting zone at a rate to supply about 0.85–0.95 moles of ammonia per mole of alkanoic acid; and c. removing the aqueous solution comprising or consisting essentially of the ammonium salt of the alkanoic acid, said alkanoic acid in the free state, and water from the mixing and reacting zone, and recovering said aqueous solution.

In especially preferred embodiments of the invention as recited in Embodiment B, supra:

1. The alkanoic acid has about 4–5 carbon atoms.
2. The alkanoic acid is isobutyric acid.
3. The alkanoic acid is valeric acid.
4. The reaction zone is a jacketed reaction zone having a heat exchange medium circulating through the jacket. Water is a preferred heat exchange medium, but brine has given excellent results.

DETAILED DESCRIPTION OF THE INVENTION

It has been found that the composition of the above Summary is an excellent and effective composition for preventing the formation of rot and mildew in silage. This composition is effective for preventing rot in stored silage caused by bacteria or by mold or by both bacteria and mold.

It has also been found that the above composition in which the ammonium salt of said composition has been replaced by an equivalent quantity (i.e., an equal molar quantity) of a sodium or potassium salt of an alkanoic acid having about 2–10 carbon atoms per molecule is an excellent and effect composition for preventing the formation of rot or mold in silage.

It has also been found that an excellent composition for preventing the formation of rot or mildew in silage results where the ammonium salt of the above Summary is replaced with an equivalent amount (i.e., ½ mole of magnesium salt per mole of ammonium salt) of a magnesium salt of an alkanoic acid having about 2–10 carbon atoms per molecule.

The stoichiometry of the exothermic reaction resulting in the formation of the ammonium salt of an alkanoic acid in our process is represented by the following equation:

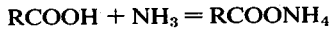

$$RCOOH + NH_3 = RCOONH_4$$

The stoichiometry of the reaction whereby an alkali metal salt of such acid is formed is represented by the following equation:

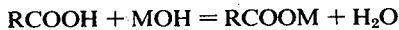

$$RCOOH + MOH = RCOOM + H_2O$$

The stoichiometry of the reaction whereby a magnesium salt is formed is represented by the following equation:

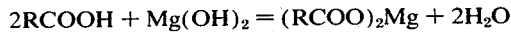

$$2RCOOH + Mg(OH)_2 = (RCOO)_2Mg + 2H_2O$$

In the above equations R is an alkyl group having 1–9 carbon atoms; and M is an alkali metal ion (i.e., sodium or potassium).

While we prefer to operate our process at about atmospheric pressure (i.e., with a pressure of about 760 mm of mercury absolute in the reaction zone) we have obtained excellent results at pressures ranging from about 500–2,000 mm of mercury absolute. It is readily apparent that more cooling (a lower reaction temperature) is required at pressures less than atmospheric than at atmospheric or higher pressures to prevent vaporization of excessive amounts of water from the reactor (mixing and reacting zone).

A more comprehensive understanding of our invention can be obtained from the following detailed description of a preferred method for operating said process involving the use of apparatus disclosed in the drawing--said drawing showing a schematic cross section view (with parts cut away) of a preferred apparatus for preparing the composition (aqueous solution of our invention).

The apparatus comprises a mixing and reaction zone (or reactor) shown generally at 1 in which the product aqueous solution is formed.

The mixing and reacting zone (also called the reaction zone or the reactor) shown generally at 1 has a side wall 2, a top 3, a bottom 4 an upper portion 5, and a lower portion 6. We generally prefer to use a jacketed reaction zone. Said jacket is shown at 7. A liquid cooling medium enters the jacket via line 8 and exists the jacket via line 9. Water is a preferred cooling medium. However, excellent results have been obtained with brine.

We prepare a mixture of water and alkanoic acid in the reactor. Water can be added via line 10 and valve 11 or via lines 27 and 19 and valves 28 and 20. The alkanoic acid can be added via line 13 and valve 14 or via lines 27 and 19 and valves 28 and 20. The water and alkanoic acid are mixed with agitator 16. Said agitator 16 is attached to drive shaft 17 which passes, via packed bushing 24, to drive motor 18 which drives said agitator 16. The reactor is vented (to the atmosphere or more preferably to a scrub chamber) via vent 26 and valve 25.

Liquid anhydrous ammonia is added to the bottom 4 of reactor 1 via lines 27 and 19 and valves 28 and 20. Alternatively, the liqued anhydrous ammonia can be added by a sparger (not shown) extending (e.g., from the top or upper portion of the reactor) into the bottom portion of the reactor.

The rate (pounds per minute) of liquid anhydrous ammonia addition is so maintained that the temperature of the reacting mixture in the reaction zone (as measured with a temperature sensing device not shown in the drawing) does not exceed about 95°C. It will be readily apparent to those skilled in the art that there is a relationship between the amount of cooling provided by the cooling liquid or medium circulating through jacket 7 and the rate at which the liquid anhydrous ammonia can be added. A greater amount of cooling permits a faster rate of ammonia addition than a lesser amount of cooling.

It will also be readily apparent to those skilled in the art that cooling jacket 7 can be replaced with internal or external cooling coils (not shown) or can be used with internal cooling coils (not shown).

When reaction is completed, the product, which is an aqueous solution can be removed from reactor 1 via lines 19 and 30 and valves 20 and 29. Alternatively, said product can be removed from the reactor via lines 19 and 27 and valves 20 and 28. The product which is removed from reactor 1 is recovered (e.g., stored in a tank or placed in a tank truck or tank car). Reactor 1 is then ready for charging with water and alkanoic acid for preparing another batch of product solution.

Where using an alkali metal hydroxide in place of anhydrous liquid ammonia (i.e., where making an aqueous mixture comprising an alkali metal salt of an alkanoic acid having 2–10 carbon atoms per molecule, the free alkanoic acid, and water) we add an aqueous solution of alkali metal hydroxide (NaOH or KOH) to the water-alkanoic acid mixture in the reaction zone via lines 27 and 19 and valves 28 and 20. The alkali metal hydroxide is substituted for ammonia on a mole for mole basis.

Where using magnesium hydroxide in place of anhydrous liquid ammonia (i.e., where making an aqueous mixture comprising a magnesium salt of an alkanoic acid having 2–10 carbon atoms per molecule, free alkanoic acid, and water) we add an aqueous slurry of magnesium hydroxide to the water-alkanoic acid mixture in the reaction zone via lines 27 and 19 and valves 28 and 20. The magnesium hydroxide is substituted for ammonia on an equivalent for equivalent basis (i.e. ½ mole of $Mg(OH)_2$ for a mole of $NH_3$).

Since the alkanoic acids used in this invention (except acetic and propionic acids) are not miscible in all proportions with water, a two phase system results where a non-miscible alkanoic acid and water are admixed in proportions outside their mutual solubility. As ammonia, or alkali metal hydroxide, or magnesium hydroxide is added to the alkanoic acid-water mixture the two phase system changes to a homogeneous solution, and the composition or solution of our invention is formed.

Also, where a slurry of magnesium hydroxide is added to a system comprising alkanoic acid and water (the alkanoic acid being present in at least a slight excess of that required by the stoichiometry) the MgOH reacts and dissolves to produce a solution, the composition or solution of our invention is formed.

The pH of solutions prepared according to the method of our invention is substantially neutral being about 7 to 7.3. This is advantageous because such neutral or substantially neutral solution does not attack metal apparatus and equipment as do solutions having a higher or lower pH. Further, our substantially neutral solutions are not corrosive to one's person or clothing nor to concrete or mortar which are present in some silos.

Our composition or solution is advantageous in that it can be applied to freshly cut corn silage which can then be placed in a silo (either an underground silo or a tower type silo), without first being air dried to prevent spoilage because of rot and/or mildew formation.

The instant invention will be better understood by referring to the following specific but nonlimiting examples. It is understood that said invention is not limited by these examples which are offered merely as illustrations; it is also understood that modifications can be made without departing from the spirit and scope of the invention.

EXAMPLE I 11,401 lbs. of water was charged into a mixing and reacting zone provided with a cooling jacket, agitating means, and a vent communicating with a scrubbing chamber. A 14,333 lb. portion of isobutyric acid was then charged into the reaction zone and admixed with the water therein. Cooling water was passed through the jacket, and 2,482 lbs. of liquid anhydrous ammonia was passed into the bottom of the reactor via a port in the reactor's bottom while agitating the liquid system within the reactor. The ammonia was fed into the reactor at such a rate that the temperature of said system was maintained at 25°–95°C. A period of 2 hours was required for the addition of ammonia to be completed. The pH of the product (an aqueous solution comprising or consisting essentially of ammonium isobutyrate, isobutyric acid, and water) was 7.1.

(In other runs the pH of the final product was 7, 7.2, and 7.3).

Said product was removed from the reactor via a port in the bottom thereof and stored in a tank. Said product was found to be an excellent agent for inhibiting the growth of mold in silage — including silage made from corn plants.

EXAMPLE 2

The general procedure of Example 1 was repeated. However, in this instance the procedure was modified by replacing the isobutyric acid with valeric acid. The materials used were:

Water — 11,401 lbs.
Valeric Acid — 16,616 lbs.
Ammonia — 2,482 lbs.

The product (a liquid aqueous solution of ammonium valerate, valeric acid, and water) had a pH of 7.2. It was found to be an excellent agent for inhibiting the growth of mold in silage including silage made from corn plants. In other runs the pH of the final product was 7, 7.1, and 7.3.

In other runs using isobutyric acid the weight ratios of water to isobutyric acid were varied so that the mole ratio of water to isobutyric acid was 1:0.16–0.36. In each instance the product was a liquid solution comprising or consisting essentially of ammonium isobutyrate, isobutyric acid, and water. In each instance the product was excellently adapted for retarding the growth of mold and mildew or silage in both underground and tower silos.

In other runs using the general procedure of Example 1 the isobutyric acid was replaced in the respective runs with alkanoic acids having 2, 3, 6, 7, and 8 carbon atoms respectively. In each of such runs the quantity of alkanoic acid was such that the mole ratio of alkanoic acid feed to ammonia feed was within the range of 1:0.85 to 1:0.95.

In each instance the product was a liquid aqueous solution excellently adapted for inhibiting the growth of rot and mold in silage.

The composition (liquid aqueous solution) of our Summary, supra, is useful for retarding or preventing the growth of mildew in silage and the like. It has been found that little or no mildew forms on silage prepared and stored in either an underground (trench type) silo or an above ground (tower type) silo if such solution is applied to the silage as it is placed in the silo (or shortly after it is placed in the silo or shortly before it is placed in the silo). We generally apply about 30–70 pounds of our composition (the solution described in the above Summary) per ton of silage, but we have obtained excellent results with lower amounts and with larger amounts of said composition).

The composition of our invention has been used with excellent results to prevent mildew from growing on moist seeds including seeds which are moistened before planting and seeds which are moistened by rain or irrigation after planting. Preferably the seeds are treated with the composition of our invention (which can be applied with or without dilution) and then air dried before planting. However, because of our disclosure various other methods for applying our composition to seeds will be readily apparent to those skilled in the art. We generally prefer to apply about 0.4–3.5 lbs. of our composition per 100 pounds of seeds. The seeds can be dried (e.g., by air drying) before planting or planted while moist.

As used herein the term "lbs" means pounds avoirdupois (i.e., 7,000 grains or 353.592 grams).

As used herein the term "mole" has its generally accepted meaning, i.e., a mole of a substance is that quantity of the substance which contains the same number of molecules of the substance as there are atoms in 12 grams of pure $^{12}C$.

As used here in the term "in the free state" as applied to an alkanoic acid means said acid is present in its uncombined form as the acid per se and not as a salt or ester of such acid. For example, vinegar is a mixture of water and acetic acid "in the free stage."

As used herein the term "mm" means millimeter or millimeters.

We claim:

1. A process for preparing a liquid solution useful for preventing rot and mildew from forming on silage or seeds comprising:
    a. forming a first mixture by admixing water and an alkanoic acid having 2–10 carbons in a mixing and reacting zone having a cooling means, an upper portion, a lower portion, and an agitating means positioned in at least the lower portion, the mole ratio of water to alkanoic acid being 1:0.16–0.36;
    b. feeding liquid anhydrous ammonia into the bottom of the mixing and reacting zone and agitating the first mixture and the resulting reacting mixture therein while maintaining the temperature of said reacting mixture at about 25°–95°C, the liquid anhydrous ammonia being added in an amount to provide about 0.85–0.95 moles of ammonia per mole of said alkanoic acid; and
    c. removing the resulting liquid solution from the mixing and reacting zone and recovering said solution.

2. The process of claim 1 in which the alkanoic acid has 4 or 5 carbon atoms.

3. The process of claim 2 in which the alkanoic acid is isobutyric acid.

4. The process of claim 2 in which the alkanoic acid is valeric acid.

5. A method for preventing rot and mildew from forming on silage or seeds comprising applying a rot and mildew preventing amount of the liquid solution prepared by the process of claim 1 to the silage or the seeds.

6. A method for preventing rot and mildew from forming on silage or seeds comprising applying a rot and mildew preventing amount of the liquid solution prepared by the process of claim 3 to the silage or the seeds.

7. A method for preventing rot and mildew from forming on silage or seeds comprising applying a rot and mildew preventing amount of the liquid solution prepared by the process of claim 4 to the silage or the seeds.

* * * * *